United States Patent Office 3,345,797
Patented Oct. 10, 1967

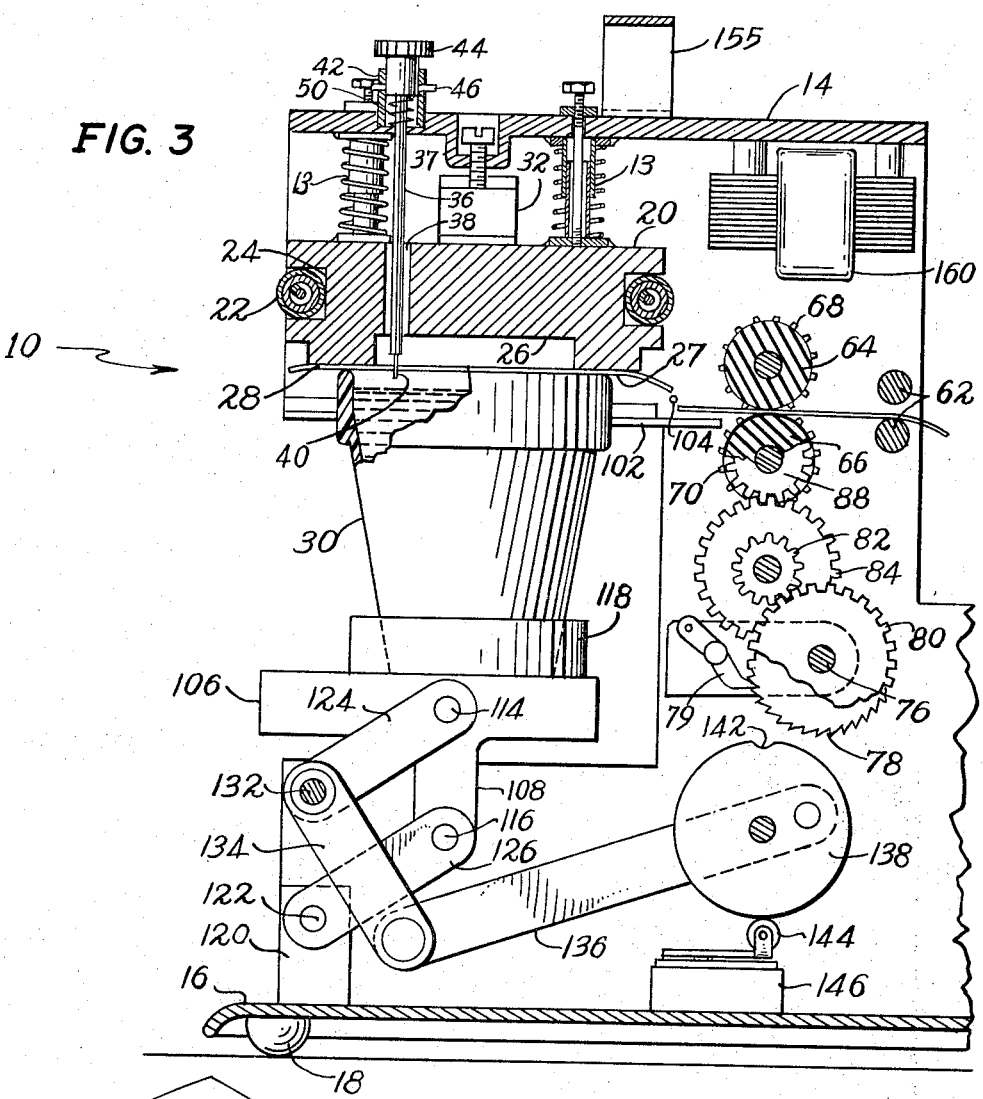
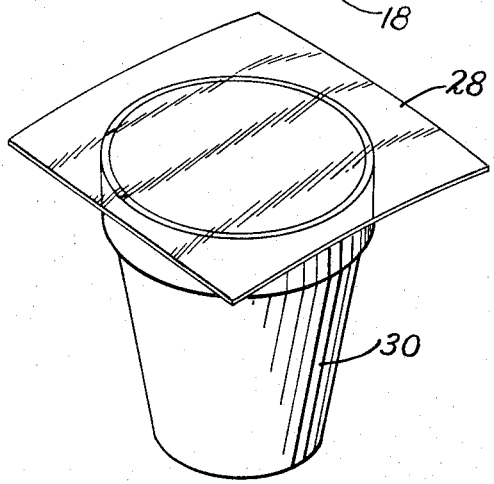
FIG. 3
FIG. 4
INVENTOR
Walter Von Stoeser

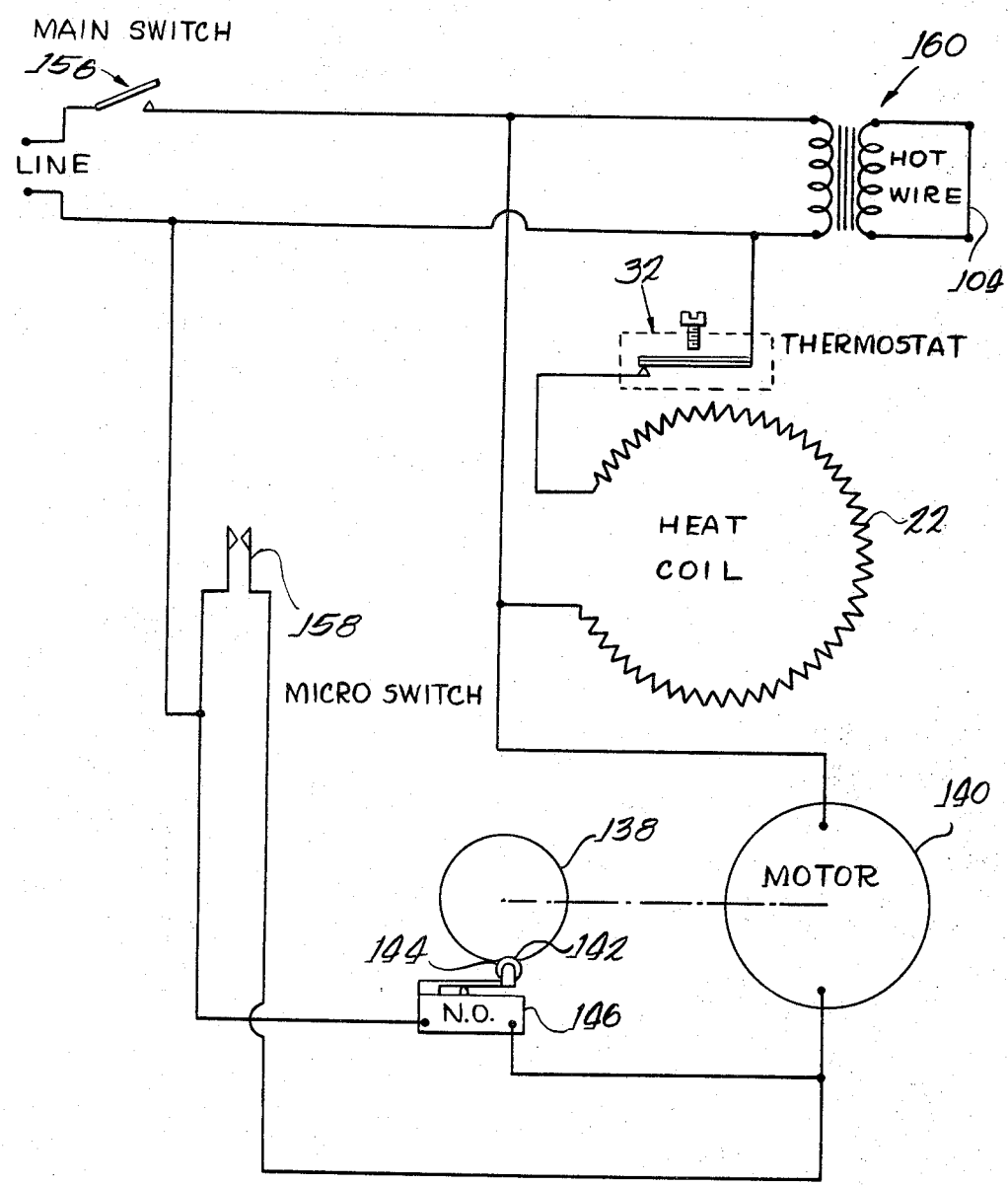

3,345,797
HEAT SEALING METHOD AND APPARATUS
Walter George Von Stoeser, Lake Villa, Ill., assignor to The Dow Chemical Company, Midland, Mich., a corporation of Delaware
Filed Aug. 3, 1964, Ser. No. 387,152
14 Claims. (Cl. 53—39)

This invention relates to a heat sealing method and apparatus and more particularly, to a method and apparatus for closing the open end of a plastic container by heat sealing a plastic film to the container.

This invention is a continuation-in-part of an application filed Apr. 29, 1963, Ser. No. 276,640, by Walter Von Stoeser, now abandoned.

In the restaurant, and drive-in eating establishments, it is becoming more common to utilize thermal insulating plastic containers, e.g., cups, for hot and cold foods. Such containers, which are preferably formed of molded expandable plastic beads, such as polystyrene, are especially well suited for use in dispensing hot coffee, for example. In conveying, or transporting such containers, it is desirable to apply a cover, or closure member, thereto so as to protect the contents, and prevent splash, to thus provide sanitary and tidy service. Various solutions to the problem of covering such containers for the indicated purpose, have been proposed and utilized with varying degrees of success. The present invention represents an improvement which affords significant advantages over known prior art devices and/or methods.

Briefly, the apparatus of the invention comprises a combination of elements including a container supporting platform, means to move the platform in the direction of a resiliently supported heated platen, and means to position a sheet of plastic film between the platform and the platen. In using the apparatus, a plastic cup containing the food product, is placed upon the platform and the latter is then moved toward the heated platen. The upper open end of the cup engages the film and forces it into engagement with the heated platen, which results in a heat sealing of the film to the periphery of the cup opening, to thus securely cover the cup, and prevent leakage of the cup contents. The film is easily peeled off of the cup by the user when it is desired to consume the contents of the cup. The entire operation, from start of platform movement, to completion of heat sealing of the film to the cup and return of platform to initial position, is very rapid, somewhere in the order of two-and-a-half seconds.

The device of the present invention is characterized by certain unique features, as will be appreciated from an understanding of the description which follows. For example, the device of the invention is extremely compact so that it will not take up much room on a work counter, and can be located in a place which will afford the most convenient service. Human error in operation is reduced to a minimum, since the user is required only to place the food containing cup on the platform, move a film feeding lever, and initiate platform operation, whereupon the device will perform the desired heat sealing of the film to thereby close the cup opening. It will be seen that the device operates to cause contact between the film and the cup prior to contact of the film with the heated platen. In such manner, heat distortion of the film, prior to engagement with the cup, is completely avoided. Furthermore, the device of the invention will accommodate a wide variety of cup sizes as now available on the market. In addition, means are provided to automatically form a small vent in the cup covering film during a heat sealing operation, so that a vapor release is provided whereby the enclosed cup is free of any distortion which could occur due to vapor pressure, as when hot liquids are enclosed.

The main object of the invention is to provide an improvement in a method and apparatus for closing the open end of a plastic container by heat sealing a plastic film to the container.

A primary object of the invention is to provide a method and apparatus for closing the end of a container with a heat sealable film wherein the film is moved by the container into engagement with a heat sealing means.

A specific object of the invention is to provide a method and apparatus for closing the end of a plastic container with a heat sealable film to protect the contents and prevent splash.

Still another object is to provide apparatus for closing the end of a plastic container with a heat sealable film, which apparatus is extremely compact and has minimum space requirements.

A further object is to provide a method and apparatus for closing the end of a plastic container with a heat sealable film wherein human error in operation is reduced to a minimum.

Another object is to provide apparatus for closing the end of a plastic container with a heat sealable film, which apparatus will automatically provide release for pressurized vapor entrapped in the container to thus avoid distortion of the sealed container.

Still another object is to provide a method and apparatus for closing the end of a plastic container with a heat sealable film wherein the complete heat sealing operation is of extremely short duration.

A further object of the device of the invention is to provide a cup heat sealing apparatus which will accommodate a wide variety of container sizes as now available on the market.

A still further object of the invention is to provide a cup heat sealing apparatus which will not only accommodate a wide variety of container sizes as now available on the market, but will also automatically adjust itself to compensate for slight variations in the height of containers within a particular selected container size.

These and further objects and features of the invention will become more apparent from the following description and accompanying drawings wherein:

FIG. 3 is a section view generally as seen along line 3—3 in FIG. 2;

FIG. 4 is a perspective-like view of a container with a sheet of plastic film heat sealed so as to cover the opening of the container, all as made according with the method and apparatus of the invention;

FIG. 5 is an enlarged perspective-like view of a container supporting platform used in the apparatus of FIG. 1;

FIG. 6 is an enlarged perspective-like view of shim means used on the supporting platform for handling containers of differing height; and FIG. 7 is an electrical circuit diagram as used for powering certain elements in the apparatus of FIG. 1.

Figure 1:
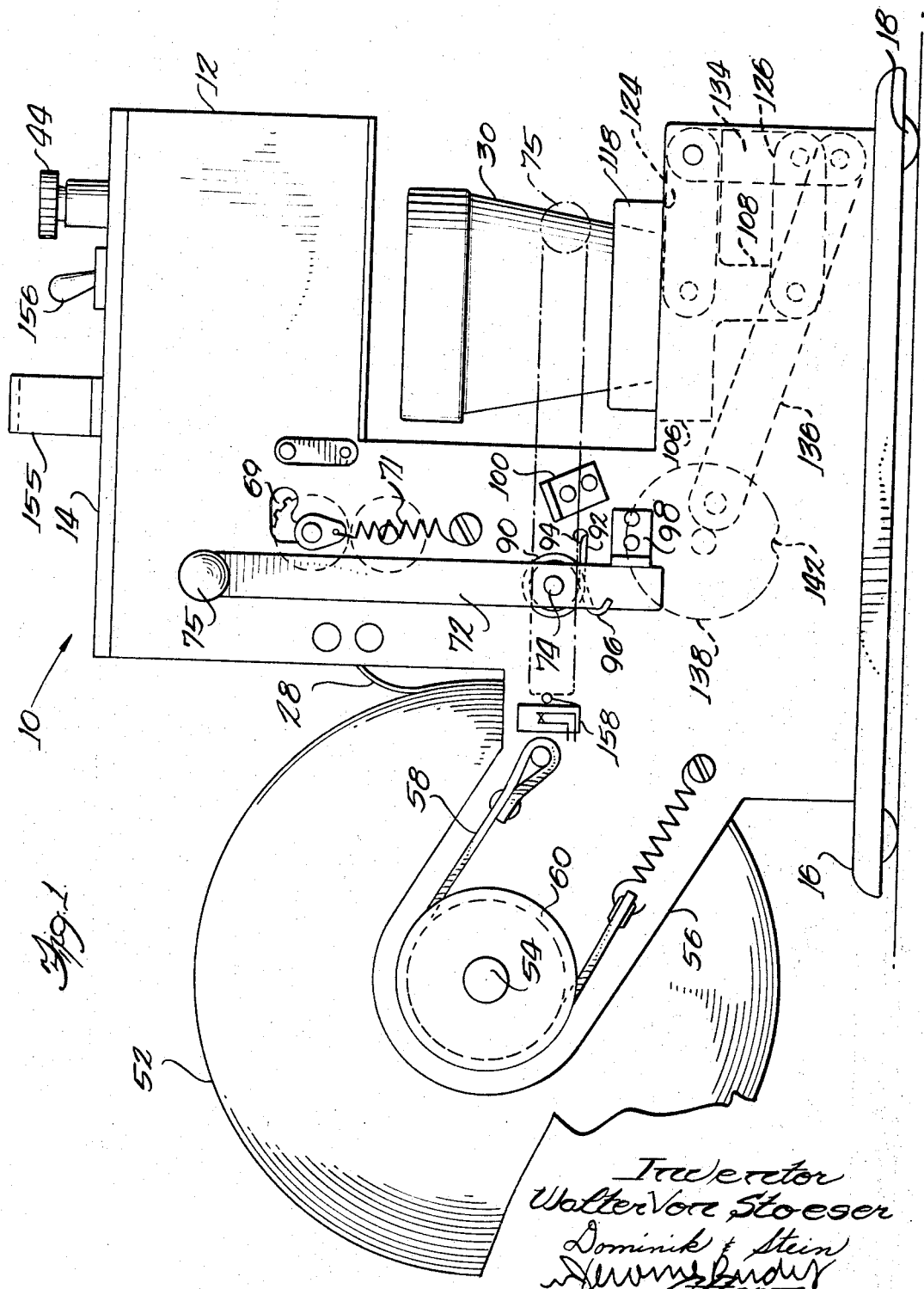
FIG. 1 is a side elevation view of apparatus embodying the principles of the invention.

Referring now to the drawings numeral 10 identifies a heat sealing device embodying the principles of the invention, which device includes a frame means having a pair of substantially identical side walls 12, a rectangular top plate or wall 14, and a rectangular base member 16, the latter two elements 14 and 16, serving to maintain the side walls 12 in vertically spaced relation. Rubber pads, or buttons 18, may be affixed to the underside of the base member at each corner thereof.

Secured to, and in spaced relation to the top wall 14, is a plastic heat sealing means comprising a disc-like platen 20, having an electrical resistance heating element 22 arranged in a groove 24 extending about the periphery of the platen, as best seen in FIG. 3. A circular recess 26 is provided in the lower side of the platen so that the platen will have a ring-like surface 27 which will engage a plastic film 28 only in the region of the upper edge of a cup-like container 30 being covered by the plastic film. In such manner, heat sealing is restricted to the region desired, to thus avoid unnecessary application of heat to a major portion of the film 28. A thermostat 32 is positioned adjacent the platen 20 for regulation of platen heat sealing temperature, which temperature will depend upon the type of material of which the container and the film is made. Generally speaking, best results are obtained when the material of the container is the same, or is closely related to the material of the film. For example, a container made of expanded polystyrene, such as Styrofoam (a Dow Chemical Company trademark), and a film made of polystyrene, such as Trycite (a Dow Chemical Company trademark), can be satisfactorily heat sealed together. A thermostat adjustment screw 34 is arranged for setting the control range of the thermostat.

A rod 36 is removably secured at one end to the top wall 14, and extends downwardly through a hole 37 formed in the wall, and a hole 38 formed in the heating platen 20. The lower extremity of the rod has a needle-like point 40 which is arranged to project beyond the plane of the heat sealing surface 27, when the rod is in lowermost supported position. A bushing 42 is affixed to the top wall 14 and projects upwardly to slidingly receive a head piece 44 affixed to the pin 36. A pin 46 extending through the head piece, is arranged to cooperate with a bayonet-like slot 48 formed in the bushing 42 whereby the rod 36 can be maintained in a lower position so that the needle point 40 can puncture the film. A spring 50 is compressively arranged beneath the head piece 44 so that the pin 46 will be maintained in holding position in the slot 48. It will be seen (FIG. 2) that the pin 46 can be disengaged from holding position in the slot by a slight rotation of the head piece 44.

A plastic film feeding and positioning means for a roll of film 52 includes a shaft 54 supported at the rear of the device. The shaft is journalled for rotation in extension portions 56 of the side walls 12. A spring tensioned belt 58 is arranged to act upon a pulley 60 secured to an end of the shaft 54, to regulate, or brake, rotary movement of the roll 52 after a given amount of film is drawn off therefrom during a container closing operation. Extending in parallel relation between the side walls 12, are guide rods 62 positioned to direct the strip of film 28 from the roll 52 to a pair of pull rollers 64 and 66, which are coupled for simultaneous rotation in opposite directions by intermeshing spur gears 68 and 70 respectively. The upper roller 64 has its supporting shaft arranged in a bayonet slot 69 formed in each side wall whereby the roller 64 may be moved away from roller 66, and maintained in such position during a film loading operation. Spring means 71 maintained in tension are arranged to urge the roller 64 into engagement with roller 66.

Figure 2:
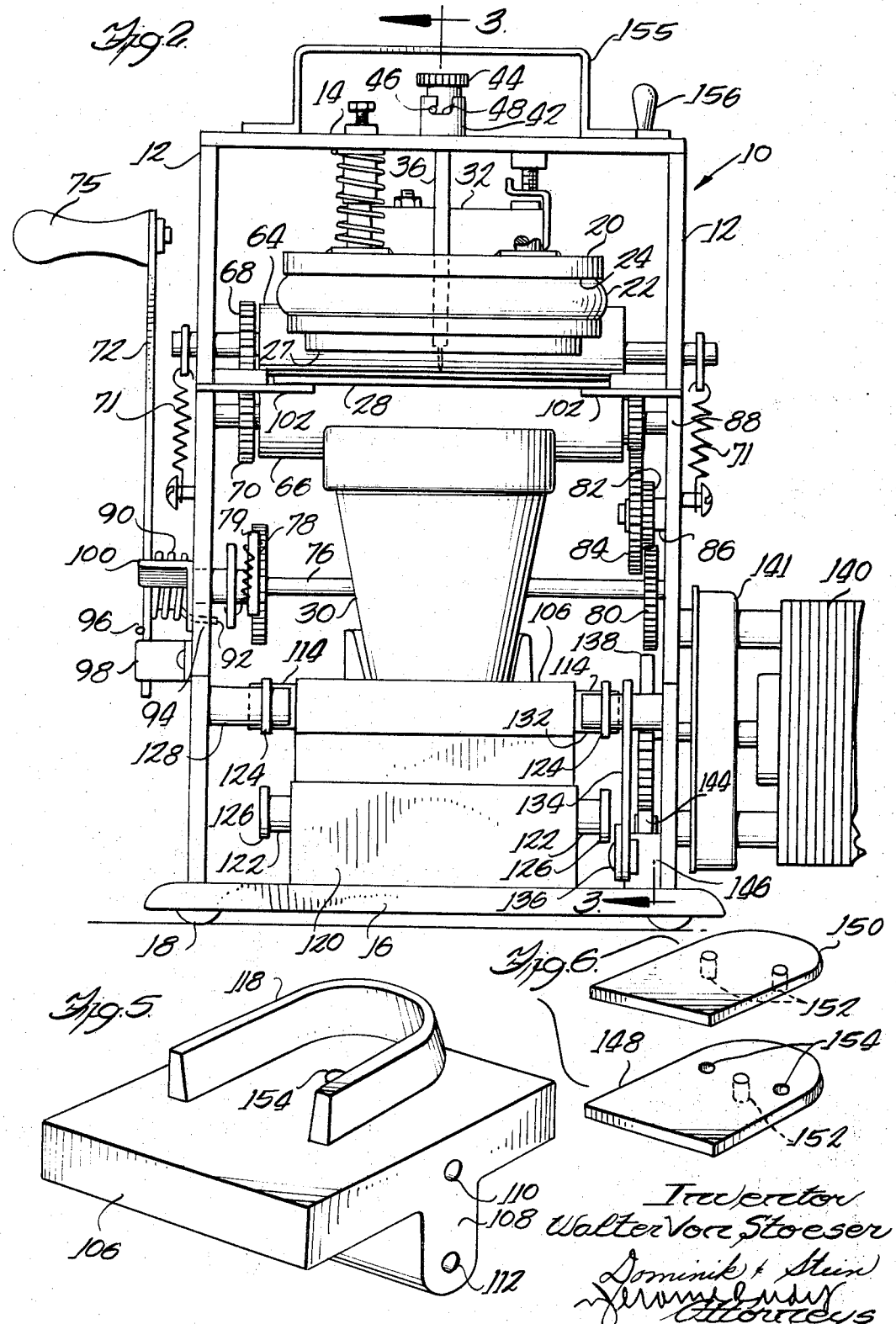
FIG. 2 is a front elevation of the same.

The rollers 64 and 66 are rotated by angular motion of a lever 72 arranged exteriorly of a side frame 12, which lever is affixed to one end of a drive shaft 74 and has a knob or handle 75 at the upper end. The other end of the shaft 74 is slip coupled to an axially aligned shaft 76 which is journalled to the other side frame 12, as best seen in FIG. 2. A ratchet wheel 78 is mounted upon the shaft 76 adjacent the end of the drive shaft 74, and a spring loaded clog 79 is arranged to prevent rotation of the ratchet wheel in clockwise direction (FIG. 3). A spur gear 80 is mounted to the shaft 76 near a side wall 12, and engages with a smaller diameter spur gear 82 coupled in axial alignment with a larger diameter spur gear 84, both of the gears 82 and 84, being rotatably supported upon a shaft 86 affixed to the side wall (FIG. 2). The gear 84 is arranged to mesh with a spur gear 88 secured to the end of the pull roller 66.

A helical spring 90 is tensionally positioned about the drive shaft 74 and has a hook 92 at one end which engages a hole 94 formed in a side wall 12, and a hook 96 at the other end which is bent around the lever 72. It will be seen (FIG. 1) that the spring 90 will constantly urge the lever 72 in a counterclockwise direction. Lever stops 98 and 100 are affixed to the side wall to limit the arcuate movement of the lever 72, as required to cause operation of the pull rollers 64 and 66 to deliver a given amount of film for a container closing operation.

Secured in opposition to the inside of the side walls 12 are ledge means 102, arranged to guidingly support the strip of film 28 as it is being moved forwardly in the device by the pull rollers 64 and 66. As best seen in FIG. 2, the ledge means 102 is positioned so that the film 28 is in spaced parallel relation with the heating platen surface 27.

A cut-off means in the form of a hot wire 104 is horizontally arranged to extend between the side walls 12 and at a slight distance above the film 28 (FIG. 3), so that upon upward movement of the film during a container closing operation, the film will be severed by the hot wire.

A container supporting platform 106 is arranged between the side walls so that the upper surface thereof is substantially parallel with the heat sealing surface 27. The platform has a downwardly extending portion 108 at mid-region, and holes 110 and 112 are provided for receipt of link attachment pins 114 and 116, said holes being in vertical alignment (FIG. 3). A container locating wall 118 is provided on the upper surface of the platform 106. A wall means 120, attached to the base member 16, is positioned toward the front of the device, and has a pair of axially aligned shafts 122 extending from each side thereof.

The platform 106 is raised toward the heated platen 20 by a parallelogram type linkage means including pairs of links 124 and 126, one pair of each being on each side of the platform. A link 124 on one side is rotatably supported at one end of a shaft 128 affixed to and adjacent side wall 12, while the other end of said link is rotatably attached to a pin 114. The link 124 on the other side is secured to a shaft 132 rotatably supported by the side wall, while the other end of the link is rotatably affixed to a pin 114. Links 126 are each rotatably supported at one end upon a pin 122, while the other end of each link 126 is rotatably attached to a pin 116. The links 124 and 126 are both of the same length, and are pinned so that they are in parallel position in all positions of movement. As a result, movement of the platform will be such so as to assure that the container supporting upper surface thereof will always remain parallel with the heat sealing surface 27 of the platen 20, in all positions of movement, and in either direction of movement.

A link member 134 is affixed to the shaft 132 at one end and is pivotally connected at the other end to a motion transfer rod 136. The other end of the rod 136 is pivotally affixed to a circular cam 138 affixed adjacent a side wall 12, and rotatably driven by an electric motor 140, supported upon the exterior of the side wall and acting through a speed reducer 141, if required for speed considerations. A notch 142, is formed in the periphery of the cam, which notch is engaged by a contact arm roller 144 of a normally open electric switch 146. The notch 142 is angularly positioned so as to coincide with the relative position of the platform. In other words, when the cam notch 142 is in up position (FIG. 3), the platform is in raised position, and when the cam notch is in down position, the platform is in lowered position (FIG. 7). A cam rotation of 20 r.p.m. was found to be satisfactory. Links 124 and 134 operate as a bell crank for rotation of the shaft 132.

To change the effective height of the platform 106, or the distance at rest position between the platform and the heat sealing surface 27 of the platen, for accommodation of different size containers, a plurality of shims 148, 150 are provided. The shims fit upon the surface of the platform within the confines of the wall 118, and are maintained against sliding movement by pin means 152 projecting from the bottom of each shim and arranged for insertion into holes 154 formed in the surface upon which the respective shim is to be supported (FIG. 6). A handle 155 may be secured to the top plate 14 if desired for easy transportation of the device.

The shims 148 and 150, while effective to adapt the apparatus to accommodate different size containers, are not effective to compensate for the slight variations in the height of the containers within a particular container size, e.g., within a selected 8-ounce size container, each of the 8-ounce containers may slightly vary in height. In such cases, the compressive force exerted upon the container may not be sufficient to effect a good heat seal between the film and the lip, or open edge of the container. In order to compensate for this slight variation in height, the platen 20 is secured to the top wall 14 by means of four spring loaded studs 13, two of which may be seen in FIG. 3. The studs 13 are positioned so that the platen 20 is held in parallel relationship with the platform 106, and the platen 20 is normally supported so that the distance between the container supporting surface and the heat sealing surface 27 is approximately $\frac{1}{16}''$ less than the height of the selected size container. When a container is elevated to contact the heat sealing surface 27 of the platen 20, a sufficient force will be applied to effect a good heat seal, without damaging the container, since the platen 20 will automatically adjust its longitudinal position to compensate for the height of the container.

The spring-load studs 13 are preferably of the adjustable type so that they may be initially adjusted to provide the proper compressive force upon the containers, and so that they may be later adjusted to compensate for "sagging" or the like which may result from use over an extended period of time.

An electrical circuit for operation of the device is shown in FIG. 7. A main switch 156 is arranged in one of the inlet power lines, which may be used to initiate current flow into the heating element 22, to put the device in readiness for a heat sealing operation. Motor operation is initiated by a micro switch 158, which is operated by the lever 72. A transformer 160 is arranged to provide the necessary voltage to heat the hot wire 104.

It will be seen that after closing of the main switch, operation of the micro switch 158 will initiate motor operation causing rotation of cam 138. As soon as the switch roller 144 is moved out of the cam notch 142, an electrical circuit will be maintained through the motor 140 until the cam rotates through 360°. In other words, after switch 146 is activated the micro switch 158 can be opened, without disrupting motor operation.

The use of the apparatus for a container closing operation should be apparent, and briefly is as follows: After the main switch 156 is closed and the device has attained predetermined operating temperatures, a container 30, having a food product therein, e.g., coffee, tea, soup, soda, etc., is placed upon the platform 106. The lever 72 is then pulled forward which causes a portion of film 28 to be unrolled from the roll 52, of sufficient length as to cover the container 30 (FIG. 3). Also, the end of the lever 72 engages the micro switch 158 to operate it to initiate motor operation to raise the platform 106 so that the upper end of the container engages the film 28 and forces it into firm contact with the heat sealing surface 27 of the platen. It may be noted that with this arrangement one step in the operation, as disclosed in the above-mentioned application, is eliminated and furthermore prevents an operator from advancing the film for the cup cover before the cup is in place. In heat sealing operations on a given container, the distance between the container supporting surface and the heat sealing surface 27, is approximately $\frac{1}{16}''$ less than the height of the container. When the open edge of the container engages the platen 20, the longitudinal position of the platen is automatically adjusted to compensate for slight variations in the height of the containers. In such manner, sufficient compressive force is exerted upon the container so as to effect a good heat seal between the film and the lip, or open edge of the container, regardless of slight variations in the height of the containers.

The shape of the cam 138 and location of the notch 142 relative to the platform location, as hereinbefore noted, assures fairly rapid raising and lowering movement of the platform, with a deceleration of platform movement as it approaches the upper limit. The dwell time automatically achieved at the upper limit of platform movement provides for a good heat sealing action. The linkage arrangement for moving the platform, also provides a slight lateral movement of the platform as it moves toward the heating platen, which results in a sliding action of the container and film upon the heating platen, which contributes to a more effective heat sealing action.

Upward movement of the film by the container forces the film into contact with the hot wire resulting in a severance of the film (FIG. 3). The linkage mechanism and cam arrangement automatically returns the platform to initial (down) position after heat sealing is effected. At such point the switch roller 144 enters the cam notch 142, whereupon the switch 146 is opened and motor operation ceases. It will be noted that the needle point 40 will punch a hole in the film during the actual heat sealing of the film to the container.

From the foregoing it will be seen that the above described method and apparatus will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. A method of closing the open end of a plastic container with a heat sealable plastic film comprising the steps of, drawing a strip of plastic film from a roll and positioning a given portion of the strip in spaced parallel relation to a flat heated platen, positioning a plastic container having an opening with the periphery thereof in spaced parallel relation to the platen, moving the container so that the edge of the opening is brought into engagement with the film, continuing said movement so that the film is forced into firm engagement with the heated platen to effect a heat seal of the film to the container, forming a small opening in the film and within the confines of the peripheral edge of the opening as the film is forced into firm engagement with the heated platen, cutting off said given portion of the strip from the roll, and removing the container with attached film from engagement with the heated platen.

2. Apparatus for closing the open end of a plastic container by heat sealing a plastic film to the container comprising in combination, a frame means, a heatable platen supported for longitudinal movement in said frame means, a container supporting platform, a linkage means pivotally connected between the frame and the platform, motive means operative upon said linkage means to cause movement of the platform relative to the platen, means to support a roll of plastic film upon the frame means, guide means for directing a portion of said film in spaced parallel relation to the platen so that a container supported upon said platform can move said film portion into engagement with the platen, a needle point projecting from the platen for piercing said film, said platen being automatically adjusted longitudinally to compensate for slight variations in height in said containers when engaged by said containers, and a cutting means to sever the film portion from the roll after the portion has been heat sealed to the container.

3. Apparatus for closing the open end of a plastic container by heat sealing a plastic film to the container comprising in combination, a frame means having parallel spaced vertically extending sides, a heatable platen resiliently supported between said sides, said platen having a horizontal flat portion, a container supporting platform arranged between said sides, said platform having a horizontal flat portion, a linkage means on each side of the platform pivotally connected between the frame and the platform to guidingly move the platform in a parallel manner relative to the platen, a guide means for directing a portion of said film in spaced parallel relation to the platen so that a container supported upon said platform can move the film portion into engagement with the platen, motive means operative upon said linkage means to cause platform movement, a cam means arranged to regulate the extent of platform movement, means to unwind a given portion of said film from the roll, and a hot wire to sever the unwound portion of said film from the roll.

4. In apparatus according to claim 3, wherein said platen includes electrical heating means, and a thermostat control for regulating the temperature of said platen within a predetermined range.

5. In apparatus according to claim 3, wherein means are provided to regulate the distance between the platen flat portion and the platform flat portion.

6. In apparatus according to claim 5, wherein the distance regulating means comprises a shim which is removably supported upon the platform.

7. In apparatus according to claim 3, wherein said cam means is arranged to provide a rapid movement of the platform toward and away from the platen, with a predetermined dwell time at the limit of movement of the platform toward the shaft.

8. In apparatus according to claim 3, wherein a center portion of the heat platen has a recess whereby a heat sealing edge portion of minimal area is provided.

9. In apparatus for closing the open end of a plastic container by heat sealing a plastic film to the container comprising in combination, a frame means, a heatable platen supported for longitudinal movement in said frame means, a container supporting platform, a parallelogram linkage means pivotally connected between the frame and the platform, a bell crank, a rod extending between the bell crank and a rotatable cam for operation of the bell crank, a motor means for operation of the cam, and a switch operable by action of the cam to control an electrical circuit through the motor.

10. In apparatus according to claim 9, wherein said roller means includes two rollers which are in spaced relation to provide a friction engagement with the film, one of said rollers being movable relative to the other roller so as to provide clearance between the rollers during a film threading operation.

11. Apparatus for closing the open end of a plastic container by heat sealing a plastic film to the container comprising in combination, a frame means having parallel spaced vertically extending sides, a heatable platen resiliently supported between said sides, said platen having a horizontal flat portion, a container supporting platform arranged between said sides, said platform having a horizontal flat portion, a linkage means on each side of the platform pivotally connected between the frame and the platform to guidingly move the platform in a parallel manner relative to the platen, a guide means for directing a portion of said film in spaced parallel relation to the platen so that a container supported upon said platform can move the film portion into engagement with the platen, motive means operative upon said linkage means to cause platform movement, a cam means arranged to regulate the extent of platform movement, means to unwind a given portion of said film from the roll, said means upon being operated automatically activating said motive means to cause platform movement, and a hot wire to sever the unwound portion of said film from the roll.

12. In apparatus for closing the open end of a plastic container by heat sealing a plastic film to the container comprising in combination, a frame means, a heatable platen supported for longitudinal movement in said frame means, a container supporting platform, a parallelogram linkage means pivotally connected between the frame and the platform, a bell crank, a rod extending between the bell crank and a rotatable cam for operation of the bell crank, a motor means for operation of the cam, a film handling means including a roller means to draw a given amount of film from a roll and a lever means which is manually movable to operate the roller means, the lever means on being moved to operate the roller means automatically operating a first switch to close an electrical circuit through the motor, and a second switch operable by action of the cam to control the electrical circuit independent of the first switch.

13. In apparatus for closing the open end of a plastic container by heat sealing a plastic film to the container comprising in combination, a frame means, a heatable platen freely and resiliently supported for longitudinal movement in said frame means, a needle point projecting from the platen for piercing said film, a container supporting platform arranged for movement relative to the platen, means for operating said container supporting platform, a film handling means including a roller means to draw a given amount of film from a roll, a film supporting means to direct the drawn film in spaced relation to the heatable platen, and a lever means which is manually movable to operate the roller means the lever means on being moved to operate the roller means initiating the operation of the container supporting platform operating means.

14. In apparatus for closing the open end of a plastic container by heat sealing a plastic film to the container comprising in combination, a frame means, a heatable platen supported for longitudinal movement in said frame means, a container supporting platform arranged for movement relative to the platen, a film handling means including a roller means to draw a given amount of film from a roll, a film supporting means to direct the drawn film in spaced relation to the heatable platen, and a lever means which is manually movable to operate the roller means, means including a switch mounted to be energized by the lever for operating said container supporting platform, said lever means upon being moved to operate the roller means engaging and operating said switch to initiate operation to automatically raise and lower said container supporting platform to engage the platen to heat seal said film to said container.

References Cited

UNITED STATES PATENTS

| | | |
|---|---|---|
| 2,825,194 | 3/1958 | Page. |
| 2,866,570 | 12/1958 | Powell _____ 220—44 X |
| 3,112,587 | 12/1963 | Anderson et al. ____ 53—373 X |
| 3,248,851 | 5/1966 | Ford _____ 53—373 |

TRAVIS S. McGEHEE, *Primary Examiner.*